United States Patent
Kim et al.

(10) Patent No.: US 8,155,325 B2
(45) Date of Patent: Apr. 10, 2012

(54) SOUND QUALITY DISPLAY APPARATUS, SOUND QUALITY DISPLAY METHOD, COMPUTER READABLE MEDIUM ON WHICH SOUND QUALITY DISPLAY PROGRAM IS RECORDED AND SOUND CAMERA

(75) Inventors: Young-Key Kim, Yuseong-gu (KR); Bong-Ki Kim, Yuseong-gu (KR); Jae-Seung Kim, Yuseong-gu (KR); Hyun-Sil Kim, Yuseong-gu (KR); Hyun-Ju Kang, Yuseong-gu (KR); Sang-Ryul Kim, Yuseong-gu (KR)

(73) Assignee: Korea Institute of Machinery & Materials, Daejeon (KR)

( * ) Notice: Subject to any disclaimer, the term of this patent is extended or adjusted under 35 U.S.C. 154(b) by 1153 days.

(21) Appl. No.: 11/940,701

(22) Filed: Nov. 15, 2007

(65) Prior Publication Data

US 2008/0260167 A1     Oct. 23, 2008

(30) Foreign Application Priority Data

Apr. 17, 2007  (KR) .................. 10-2007-0037268

(51) Int. Cl.
*H04R 29/00* (2006.01)
(52) U.S. Cl. ............... 381/56; 381/58; 381/59; 381/122
(58) Field of Classification Search .................. 381/56, 381/58, 59, 122
See application file for complete search history.

(56) References Cited

U.S. PATENT DOCUMENTS

| | | | |
|---|---|---|---|
| 5,490,599 A * | 2/1996 | Tohidi | 211/171 |
| 7,406,001 B1 * | 7/2008 | Dzikowicz | 367/138 |
| 7,980,704 B2 * | 7/2011 | Kondo et al. | 353/79 |
| 2004/0193789 A1 * | 9/2004 | Rudolf | 711/108 |
| 2011/0134209 A1 * | 6/2011 | Schmidt | 348/38 |

FOREIGN PATENT DOCUMENTS

| | | | |
|---|---|---|---|
| JP | 11-23357 | 1/1999 | |
| JP | 2000-291846 | 10/2000 | |
| JP | 2002-320618 | 11/2002 | |
| JP | 2004-77277 | 3/2004 | |
| JP | 2004-286562 | 10/2004 | |
| JP | 2006-214740 | 8/2006 | |
| JP | 2006-522919 | 10/2006 | |
| WO | WO2004/068085 | * 8/2004 | 3/12 |
| WO | WO 2004/068085 A2 | 8/2004 | |

* cited by examiner

*Primary Examiner* — Victor A Mandala
(74) *Attorney, Agent, or Firm* — Oblon, Spivak, McClelland, Maier & Neustadt, L.L.P.

(57) ABSTRACT

Disclosed are a sound quality display apparatus, a sound quality display method, a computer readable medium on which a sound quality display program is recorded, and a sound camera. The apparatus includes a sound detector detecting sound generated from a sound source, a background photographing unit photographing background where the sound source is positioned, a sound source signal generator creating a sound source signal as a sound signal at a sound source plane where the sound source is positioned by analyzing the sound signal detected by the sound detector, a sound quality data generator creating sound quality data at the sound source plane by processing of the sound source signal, and a display displaying sound quality image data created by overlaying image data of the background photographed by the background photographing unit with the sound quality data.

21 Claims, 14 Drawing Sheets

SOUND QUALITY DISPLAY APPARATUS, SOUND QUALITY DISPLAY METHOD, COMPUTER READABLE MEDIUM ON WHICH SOUND QUALITY DISPLAY PROGRAM IS RECORDED AND SOUND CAMERA

BACKGROUND OF THE INVENTION

1. Field of the Invention

The present invention relates to a sound quality displaying apparatus, a sound quality displaying method, a computer readable medium in which a sound quality displaying program is recorded, and a sound camera.

2. Description of the Related Art

Today when great stride of electronic and machine industries promotes the benefit of human life, electronic and mechanical devices (hereinafter, referred to as an 'electronic device') have a task for satisfy items in connection with quality of human life such as comfort and pleasantness in addition to simple functions of substituting work for human being.

The most part of the electronic devices generates loud and soft noise due to its structural feature. In a serious case, the driving noise of the electronic device causes a pain and stress to a user. Therefore, to minimize the driving noise of the electronic device is a basic task to be solved for the improvement of the life quality of human, and recently various devices are developed and various methods are proposed for the minimization of the noise.

In order to effectively reduce noise, firstly noise must be precisely detected from a noise source to generate reliable noise information.

Particularly, position information of the noise source among the noise information is one of important noise information. In the conventional art, a noise source with high sound pressure level is detected in a specific frequency based on a magnitude of sound, that is, sound pressure level, and then position information of the noise source is generated.

However, there is a need for position information about a noise source, among the noise sources, in which sound is irregularly generated and which cannot be easily detected because sound is weaker than that well-known noise source, rather than a noise source with high sound pressure level, that is, a noise source which is widely known as a noise source, and which is easily detected due because sound is regular and loud, such as an engine and speakers of a vehicle among noise sources. For example, although the loudest sound is generated from the engine in the vehicle, since a designer for the vehicle already knows the fact that engine noise is generated from the engine and the engine noise is regularly generated, the engine noise does not cause a user of the vehicle to feel so strong stress. However, since frictional sound between parts or vibration during the traveling of the vehicle, such as clicking or creak gives a strong stress to the vehicle user rather than the engine noise, the vehicle designer strongly demands position information about the noise sources.

Moreover, a person hears noise and under stress, it is not principal cause of the stress that the noise is simply loud. For example, when music is played loud through a woofer in a vehicle, vibration can be heard in the vehicle. In this case, human recognizes sound from the speaker as music, but the vibration as noise causing stress.

As such, since the position information of the noise source is simply generated based on the sound pressure level, the conventional art cannot detect the position of the noise source for actually causing stress to human precisely. Moreover, since the noise is detected based on only the sound pressure level, the conventional art cannot measure the noise based on various factors.

SUMMARY OF THE INVENTION

Therefore, the present invention has been made in view of the above problems, and it is an aspect of the present invention to provide a sound quality display apparatus for precisely detecting a position of a noise source for generating noise, a sound quality display method, a computer readable medium on which a sound quality display program is recorded, and a sound camera.

It is another aspect of the present invention to provide a sound quality display apparatus for measuring noise based on various factors, a sound quality display method, a computer readable medium on which a quality display program is recorded, and a sound camera.

The aspects of the present invention are not limited by the above-mentioned aspects, and these and another aspects of the present invention can be understood by those skilled in the art from the following description.

In order to achieve the object, there is provided a sound quality display apparatus comprising: a sound detector for detecting sound generated from a sound source; a background photographing unit for photographing a background where the sound source is positioned; a sound source signal generator for creating a sound source signal as a sound signal at a sound source plane where the sound source is positioned by analyzing the sound signal detected by the sound detector; a sound quality data generator for creating sound quality data at the sound source plane by processing of the sound source signal; and a display for displaying sound quality image data created by overlaying image data of the background photographed by the background photographing unit with the sound quality data.

According to one aspect of sound quality display apparatus, the sound detector detects sound, generated from the sound source at a position from which the sound detector is distant. At the same time, the background photographing unit takes a picture of the background where the sound source is positioned at a position distant from the sound source. The sound source signal generator analyzes the sound signal detected by the sound detector to create the sound source signal as the sound signal at the sound source plane where the sound source positions. The sound source signal is a sound signal at the sound source plane which is created by analyzing the sound signal detected at a sound detecting plane where the sound detector is positioned. Moreover, the sound source signal indicates a sound signal at respective positions of the sound source plane. That is, the sound source signal contains sound pressure level information of pixels corresponding to position of the respective pixels of the image data photographed by the background photographing unit. The sound quality generator processes the sound source signal to create sound quality data at the sound source plane. The sound quality data is created by the signal processing of a noise factor that is recognized by human. The sound quality data created from the sound source signal also contains sound quality data of pixels corresponding to the positions of the respective pixels of the image data. The display displays quality image data which is created by overlaying the image data of the background photographed by the background photographing unit with the sound quality data. Therefore, the sound quality display apparatus of the present invention can create the sound quality data from the sound signal and can overlay the image data of the background where the sound source positions with the sound quality data.

Therefore, the sound quality display apparatus can precisely display the position of the noise source for generate noise. Moreover, the image data is overlaid with the sound quality data so that a user can easily recognize the information about the sound quality of the noise source.

According to another aspect of the sound quality display apparatus, the sound quality data comprises loudness, sharpness, roughness, fluctuation strength, modulation depth, or tonality, as a quantitative factor.

According to this aspect of the sound quality display apparatus, the sound quality data contains a quantitative factor such as loudness, sharpness, roughness, fluctuation strength, modulation depth, and tonality. The loudness is a recognizing quantity for the intensity of the sound, the sharpness is a recognizing quantity for a sharp sound, the roughness is a recognizing quantity for a rough sound, the fluctuation strength and the modulation depth are recognizing quantities for variation of the sound, and the tonality is a recognizing quantity for the composition of the sound. As such, these factors express the sound quality in quantitative manner and are noise references for determining the noise level, respectively.

Therefore, the sound quality display apparatus can precisely display the position of the sound source and can measure noise based on various factors.

According to another aspect of the sound quality display apparatus, the sound source signal comprises a sound source signal created by performing a frequency domain analysis.

According to this aspect, the sound quality display apparatus performs the analysis of the sound source signal generator using a frequency domain analysis. That is, the sound source signal generator can analyze and express the detected sound signal in the frequency domain.

Therefore, the sound quality display apparatus can analyze the sound signal in the frequency domain.

According to another aspect of the sound quality display apparatus, the frequency domain analysis comprises Fourier transform, beamforming, or inverse Fourier transform.

According to this aspect, the sound quality display apparatus uses a Fourier transform, a beamforming, or an inverse Fourier transform as a method for the frequency domain analysis. Here, the detected sound signal is created by the beamforming as a sound signal at the sound source plane, that is, a sound signal detected when the sound detector is installed directly to the sound source. The sound source signal contains sound pressure level information of pixels corresponding to position of the respective pixels of the image data photographed by the background photographing unit. In the present invention, it possible to use other method if the method is to analyze the sound signal in the frequency domain in addition to the Fourier transform, the beamforming, and the inverse Fourier transform.

Therefore, the sound quality display apparatus can perform the frequency domain analysis of the sound signal well.

According to another aspect of the sound quality display apparatus, the sound source signal comprises a sound source signal created by performing a time domain analysis.

According to this aspect, the sound quality display apparatus performs the analysis of the sound source signal generator using a time domain analysis. That is, the sound source signal generator can analyze and express the detected sound signal in the time domain. Moreover, in the present invention, it is possible to use the frequency domain analysis and the time domain analysis together as the signal processing.

Therefore, the sound quality display apparatus can analyze the sound signal in the time domain.

According to another aspect of the sound quality display apparatus, the time domain analysis comprises an inverse filtering of a time domain.

According to this aspect, the sound quality display apparatus uses an inverse filtering of the time domain as one of methods for the time domain analysis. In the present invention, it is possible to other method if the method is for the time domain analysis in addition to the inverse filtering of the time domain.

Therefore, the sound quality display apparatus can perform the frequency domain analysis of the sound signal well.

According to another aspect of the sound quality display apparatus, the sound detector comprises a plurality of microphones and the background photographing unit comprises a camera for taking a picture of the background.

According to this aspect, the sound quality display apparatus detects sound using two or more microphones to create the sound signal and takes a picture of the background using the camera to create the image data. Here, the number of the microphones may be changed based on an object to be detected and a circumstance for the detection of sound. Moreover, the number of the camera is not limited to one.

Therefore, the sound quality display apparatus detects sound well because of detecting sound with a plurality of microphones.

According to another aspect of the sound quality display apparatus, the sound detector comprises: a supporting member; a body member installed on the supporting member; microphone supporting ribs installed on the outer circumference of the body member at a predetermined interval and forming a spiral shape when viewing the body member in front thereof; and a plurality of microphones arranged on the front sides of the microphone supporting ribs; and the background photographing unit is installed to the front center of the body member.

According to this aspect of the sound quality display apparatus, the sound detector includes the supporting member, the body member, the microphone supporting ribs, and the microphones, and the background photographing unit is installed to the front center of the body member. Since the microphone supporting ribs form the spiral shape, the microphones are also arranged in the spiral shape. Due to the arrangement of the microphone in the spiral shape, the performance of detecting sound can be improved. Since the plural microphone supporting ribs are not integrally formed with each other but separately installed, manufacturing costs can be reduced and weight of the sound detector can be reduced. Moreover, the background photographing unit is installed to the front center of the body member so that overlapped portions can be aligned with each other when the image data of the background where the sound source is positioned and the sound quality data are displayed.

Therefore, in the sound quality display apparatus, the sound detector can detect sound well and the background photographing unit can take a picture of the background well. Moreover, manufacturing costs and time of the sound detector can be reduced and the portability thereof can be increased.

According to another aspect of the sound quality display apparatus, the number of the microphones is 4 to 48.

According to this aspect of the sound quality display apparatus, since the number of the microphones is no less than 4, the detecting performance can be improved. Moreover, the number of the microphones is equal to or less than 48 so that increase of the manufacturing costs and delay of processing time during the driving can be restricted.

Therefore, in the sound quality display apparatus, the sound detector can detect sound well.

According to another aspect of the sound quality display apparatus, the microphones are arranged on a single plane or at least two planes when viewing the sound detector in front thereof.

According to this aspect of the sound quality display apparatus, the microphones are arranged on a single plane or at least two planes when viewing the sound detector in front thereof. By doing so, the degree of freedom of the array of the microphones can be increased according to the object to be detected. Moreover, sound can be detected in stereoscopic manner so that the sound detecting performance can be enhanced.

Therefore, in the sound quality display apparatus, the sound detector can detects sound well.

According to another aspect of the sound quality display apparatus, the number of the microphone supporting ribs is 4 to 8.

According to this aspect of the sound quality display apparatus, the number of the microphone supporting ribs is no less than 4 so that the spiral shape can be maintained and the sufficient number of microphones can be arranged. The number of the microphone supporting ribs is less than 8 so that the manufacturing costs can be restricted.

Therefore, the sound quality display apparatus can detect sound well, and the manufacturing costs of the sound detector can be reduced.

According to another aspect of the sound quality display apparatus, the microphone supporting ribs are folded forward or backward.

According to this aspect of the sound quality display apparatus, the microphone supporting ribs are folded forward or backward.

Here, the folding angle is approximately 90 degrees in the forward and backward direction, respectively.

Therefore, according to the sound quality display apparatus, the portability can be enhanced.

According to another aspect of the sound quality display apparatus, the sound quality data comprises sound quality spectrum data.

According to this aspect of the sound quality display apparatus, the sound quality data contains the sound quality spectrum data in which the sound quality data is spectrumized, that is, which is displayed in different color based on the level of the sound quality of the sound quality data, and is displayed together with the background data. Here, the sound quality data may contain the sound quality spectrum data as well as data of displaying a level of the sound quality of the sound quality data, for example, sound quality numeral data of displaying a level of the sound quality of the sound quality data by numerals.

Therefore, according to the sound quality display apparatus, the position information of the noise source can be easily recognized visually.

According to another aspect of the sound quality display apparatus, the display displays the sound quality image data in real time.

According to this aspect of the sound quality display apparatus, the sound detected by the sound detector and the background photographed by the background photographing unit are processed by the sound source signal generator and the sound quality data generator and are displayed by the display in real time. By doing so, the sound quality display apparatus can display the sound quality image data almost simultaneously with detecting the sound.

Therefore, the sound quality display apparatus can display the position information of the noise source in real time.

According to another aspect of the sound quality display apparatus, the display displays the sound quality spectrum data on an image of the background such that the image of the background is projected.

According to this aspect, the sound quality display apparatus displays the spectrum on an image of the background such that the image of the background is projected. By doing so, human can recognize the position of the noise source from the background with naked eyes. Moreover, the spectrum is displayed by a color image.

Therefore, the sound quality display apparatus can precisely display the position of the noise source for generate noise. Moreover, a user can easily recognize the information about the sound quality of the noise source.

According to another aspect of the sound quality display apparatus, the display displays the sound quality image data as one of a still image and a moving picture.

According to this aspect of the sound quality display apparatus, the sound quality image data is displayed as a still image or a moving picture. The position information of the noise source can be precisely obtained by analyzing the still image and a trend of variation of the noise generated from the noise source can be understood by analyzing the moving picture.

Therefore, according to the sound quality display apparatus, the position of the noise source for generate noise can be precisely displayed.

In order to achieve the object, there is provided a sound quality display method, comprising the steps of: detecting sound generated from a sound source; photographing a background where the sound source is positioned; creating a sound source signal as a sound signal at a sound source plane where the sound source is positioned by analyzing the sound signal detected in the sound detecting step; creating sound quality data at the sound source plane by processing the sound source signal; and displaying sound quality image data created by overlaying the image data of the background photographed in the background photographing step with the sound quality data.

According to an aspect of the sound quality display method, in the sound detecting step, the sound, generated from the sound source at a position away from the sound source. At the same time, in the background photographing step, the background where the sound source is positioned is photographed at a position distant from the sound source. In the sound source signal creating step, the sound signal detected by the sound detector is analyzed to create the sound source signal as the sound signal at the sound source plane where the sound source positions. The sound source signal is a sound signal at the sound source plane which is created by analyzing the sound signal detected at a sound detecting plane where the sound detector is positioned. Moreover, the sound source signal indicates a sound signal at respective positions of the sound source plane. That is, the sound source signal contains sound pressure level information of pixels corresponding to position of the respective pixels of the image data photographed by the background photographing unit. In the sound quality data creating step, the sound source signal is processed to create sound quality data at the sound source plane. The sound quality data is created by the signal processing of a noise factor that is recognized by human. The sound quality data created from the sound source signal also contains sound quality data of pixels corresponding to the positions of the respective pixels of the image data. In the displaying step, the quality image data, which is created by overlaying the image data of the background photographed by the background photographing unit with the sound quality data, is displayed together. Therefore, the sound quality display method of the present invention can create the sound quality data from the sound signal and can overlay the image data of the background where the sound source positions with the sound quality data.

Therefore, the sound quality display method can precisely display the position of the noise source for generate noise. Moreover, the image data is overlaid with the sound quality data so that a user can easily recognize the information about the sound quality of the noise source.

According to another aspect of the sound quality display method, the sound quality data comprises loudness, sharpness, roughness, fluctuation strength, modulation depth, or tonality, as a quantitative factor.

According to this aspect of the sound quality display method, the sound quality data contains a quantitative factor such as loudness, sharpness, roughness, fluctuation strength, modulation depth, and tonality. The loudness is a recognizing quantity for the intensity of the sound, the sharpness is a recognizing quantity for a sharp sound, the roughness is a recognizing quantity for a rough sound, the fluctuation strength and the modulation depth are recognizing quantities for variation of the sound, and the tonality is a recognizing quantity for the composition of the sound. As such, these factors express the sound quality in quantitative manner and are noise references for determining the noise level, respectively.

Therefore, the sound quality display method can precisely display the position of the sound source and can measure noise based on various factors.

According to another aspect of the sound quality display method, the sound source signal comprises a sound source signal created by performing a frequency domain analysis.

According to this aspect of the sound quality display method, the analysis in the sound source signal creating step is performed using a frequency domain analysis. That is, in the sound source signal creating step, the detected sound signal can be analyzed and expressed in the frequency domain.

Therefore, the sound quality display method can analyze the sound signal in the frequency domain.

According to another aspect of the sound quality display method, the frequency domain analysis comprises Fourier transform, beamforming, or inverse Fourier transform.

According to this aspect, the sound quality display method uses a Fourier transform, a beamforming, or an inverse Fourier transform as a method for the frequency domain analysis. Here, the detected sound signal is created by the beamforming as a sound signal at the sound source plane, that is, a sound signal detected when the sound detector is installed directly to the sound source. The sound source signal contains sound pressure level information of pixels corresponding to position of the respective pixels of the image data photographed in the background photographing step. In the present invention, it possible to use other method if the method is to analyze the sound signal in the frequency domain in addition to the Fourier transform, the beamforming, and the inverse Fourier transform.

Therefore, the sound quality display method can perform the frequency domain analysis of the sound signal well.

According to another aspect of the sound quality display method, the sound source signal comprises a sound source signal created by performing a time domain analysis.

According to this aspect, the sound quality display method performs the analysis in the sound source signal creating step using a time domain analysis. That is, in the sound source signal creating step, the detected sound signal can be analyzes and expressed in the time domain. Moreover, in the present invention, it is possible to use the frequency domain analysis and the time domain analysis together as the signal processing.

Therefore, the sound quality display method can analyze the sound signal in the time domain.

According to another aspect of the sound quality display method, the time domain analysis comprises an inverse filtering of a time domain.

According to this aspect, the sound quality display method uses an inverse filtering of the time domain as one of methods for the time domain analysis. In the present invention, it is possible to other method if the method is for the time domain analysis in addition to the inverse filtering of the time domain.

Therefore, the sound quality display method can perform the frequency domain analysis of the sound signal well.

According to another aspect of the sound quality display method, the sound quality data comprises sound quality spectrum data.

According to this aspect of the sound quality display method, the sound quality data contains the sound quality spectrum data in which the sound quality data is spectrumized, that is, which is displayed in different color based on the level of the sound quality of the sound quality data, and is displayed together with the background data. Here, the sound quality data may contain the sound quality spectrum data as well as data of displaying a level of the sound quality of the sound quality data, for example, sound quality numeral data of displaying a level of the sound quality of the sound quality data by numerals.

Therefore, according to the sound quality display method, the position information of the noise source can be easily recognized visually.

According to another aspect of the sound quality display method, the sound quality image data is displayed in real time in the displaying step.

According to this aspect of the sound quality display method, the sound detected in the sound detecting step and the background photographed in the background photographing step are processed through the sound source signal creating step and the sound quality data creating step and are displayed in the displaying step in real time. By doing so, the sound quality display method can display the sound quality image data almost simultaneously with detecting the sound.

Therefore, the sound quality display method can display the position information of the noise source in real time.

According to another aspect of the sound quality display method, in the displaying step, the sound quality spectrum data is displayed on an image of the background such that the image of the background is projected.

According to this aspect, the sound quality display method displays the spectrum on an image of the background such that the image of the background is projected. By doing so, human can recognize the position of the noise source from the background with naked eyes. Moreover, the spectrum is displayed by a color image.

Therefore, the sound quality display method can precisely display the position of the noise source for generate noise. Moreover, a user can easily recognize the information about the sound quality of the noise source.

According to another aspect of the sound quality display method, in the displaying step, the sound quality image data is displayed as one of a still image and a moving picture.

According to this aspect of the sound quality display method, the sound quality image data is displayed as a still image or a moving picture. The position information of the noise source can be precisely obtained by analyzing the still image and a trend of variation of the noise generated from the noise source can be understood by analyzing the moving picture.

Therefore, according to the sound quality display method, the position of the noise source for generate noise can be precisely displayed.

In order to achieve the object, there is provided a computer readable medium on which a sound quality display program is recorded, the sound quality display program executes the steps of: detecting sound generated from a sound source; photographing a background where the sound source is positioned; creating a sound source signal as a sound signal at a sound source plane where the sound source is positioned by analyzing the sound signal detected in the sound detecting step; creating sound quality data at the sound source plane by processing the sound source signal; and displaying sound quality image data created by overlaying the image data of the background photographed in the background photographing step with the sound quality data.

According to this aspect of the sound quality display program, in the sound detecting step, the sound, generated from the sound source at a position away from the sound source. At the same time, in the background photographing step, the background where the sound source is positioned is photographed at a position distant from the sound source. In the sound source signal creating step, the sound signal detected by the sound detector is analyzed to create the sound source signal as the sound signal at the sound source plane where the sound source positions. The sound source signal is a sound signal at the sound source plane which is created by analyzing the sound signal detected at a sound detecting plane where the sound detector is positioned. Moreover, the sound source signal indicates a sound signal at respective positions of the sound source plane. That is, the sound source signal contains sound pressure level information of pixels corresponding to position of the respective pixels of the image data photographed by the background photographing unit. In the sound quality data creating step, the sound source signal is processed to create sound quality data at the sound source plane. The sound quality data is created by the signal processing of a noise factor that is recognized by human. The sound quality data created from the sound source signal also contains sound quality data of pixels corresponding to the positions of the respective pixels of the image data. In the displaying step, the quality image data, which is created by overlaying the image data of the background photographed by the background photographing unit with the sound quality data, is displayed together. Therefore, the sound quality display method of the present invention can create the sound quality data from the sound signal and can overlay the image data of the background where the sound source positions with the sound quality data.

Therefore, the computer readable medium, on which the sound quality display program is recorded, can precisely display the position of the noise source for generate noise. Moreover, the image data is overlaid with the sound quality data so that a user can easily recognize the information about the sound quality of the noise source.

In order to achieve the object, there is provided a sound camera, comprising: a supporting member; a body member installed on the supporting member; microphone supporting ribs installed on the outer circumference of the body member at a predetermined interval and forming a spiral shape when viewing the body member in front thereof; and a plurality of microphones arranged on the front sides of the microphone supporting ribs.

According to an aspect of the sound camera, the sound detector includes the supporting member, the body member, the camera, the microphone supporting ribs, and the microphones. Since the microphone supporting ribs form the spiral shape, the microphones are also arranged in the spiral shape. Due to the arrangement of the microphone in the spiral shape, the performance of detecting sound can be improved. Since the plural microphone supporting ribs are not integrally formed with each other but separately installed, manufacturing costs can be reduced and weight of the camera can be reduced. Moreover, the camera is installed to the front center of the body member so that overlapped portions can be aligned with each other when the image data of the background where the sound source is positioned and the sound quality data are displayed.

Therefore, the sound camera can detect sound well and can take a picture of the background well. Moreover, manufacturing costs and time can be reduced and the portability can be increased.

According to another aspect of the sound camera, the number of the microphones is 4 to 48.

According to this aspect of the sound camera, since the number of the microphones is no less than 4, the detecting performance can be improved. Moreover, the number of the microphones is equal to or less than 48 so that increase of the manufacturing costs and delay of processing time during the driving can be restricted.

Therefore, the sound camera can detect sound well.

According to another aspect of the sound camera, the microphones are arranged on a single plane or at least two planes when viewing the sound detector in front thereof.

According to another aspect of the sound camera, the microphones are arranged on a single plane or at least two planes when viewing the sound detector in front thereof. By doing so, the degree of freedom of the array of the microphones can be increased according to the object to be detected. Moreover, sound can be detected in stereoscopic manner so that the sound detecting performance can be enhanced.

Therefore, the sound camera can detects sound well.

According to another aspect of the sound camera, the number of the microphone supporting ribs is 4 to 8.

According to another aspect of the sound method, the number of the microphone supporting ribs is no less than 4 so that the spiral shape can be maintained and the sufficient number of microphones can be arranged. The number of the microphone supporting ribs is less than 8 so that the manufacturing costs can be restricted.

Therefore, the sound camera can detect sound well, and the manufacturing costs of the sound detector can be reduced.

According to another aspect of the sound camera, the microphone supporting ribs are folded forward or backward.

According to this aspect of the sound camera, the microphone supporting ribs are folded forward or backward. Here, the folding angle is approximately 90 degrees in the forward and backward direction, respectively.

Therefore, the portability of the sound camera can be enhanced.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
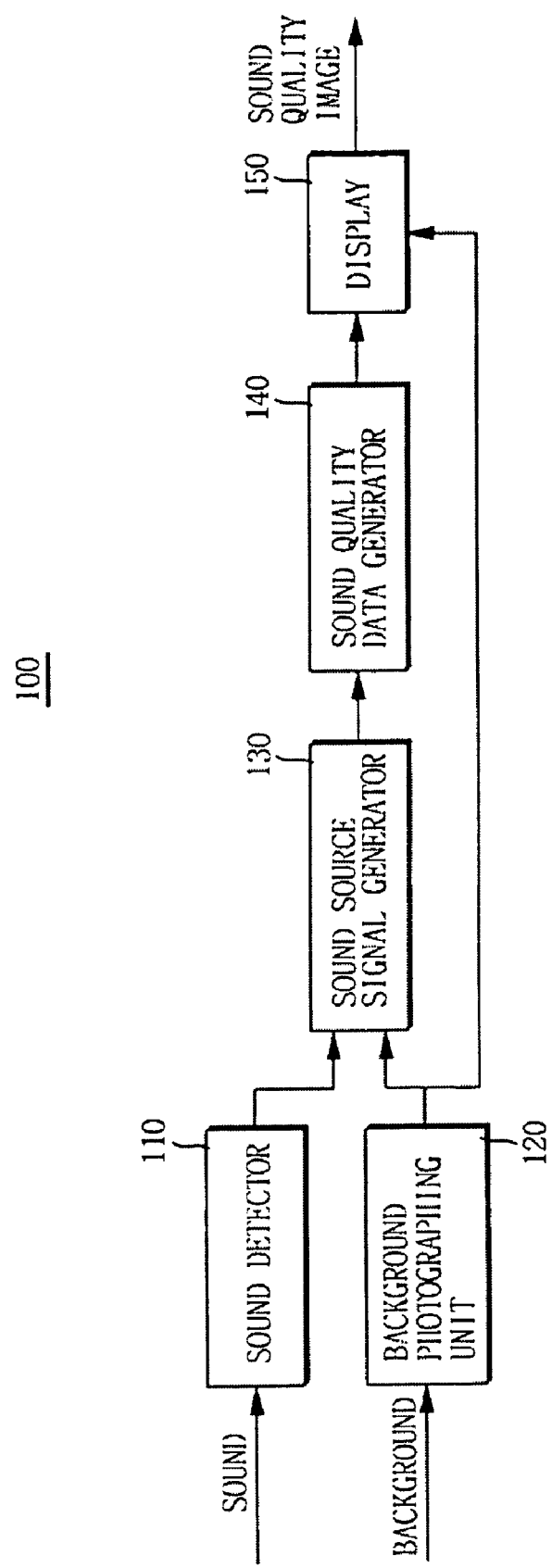
FIG. 1 is a view illustrating a sound quality display apparatus according to an embodiment of the present invention.

The detailed description in addition to the structure, operation, and effect of the present invention is contained in the following description of embodiments of the present invention and the accompanying drawings. The above and other objects, features and other advantages of the present invention will be more clearly understood from the following detailed description taken in conjunction with the accompanying drawings. Through the entire description, similar reference numerals are assigned to identical or similar components.

Hereinafter, the embodiments of the present invention will be described in detail with reference to the accompanying drawings.

FIG. 1 is a view illustrating a sound quality display apparatus according to an embodiment of the present invention.

As illustrated in FIG. 1, a sound quality display apparatus 100 according to an embodiment of the present invention includes a sound detector 110, a background photographing unit 120, a sound source signal generator 130, a sound quality data generator 140, and a display 150.

Figure 2:
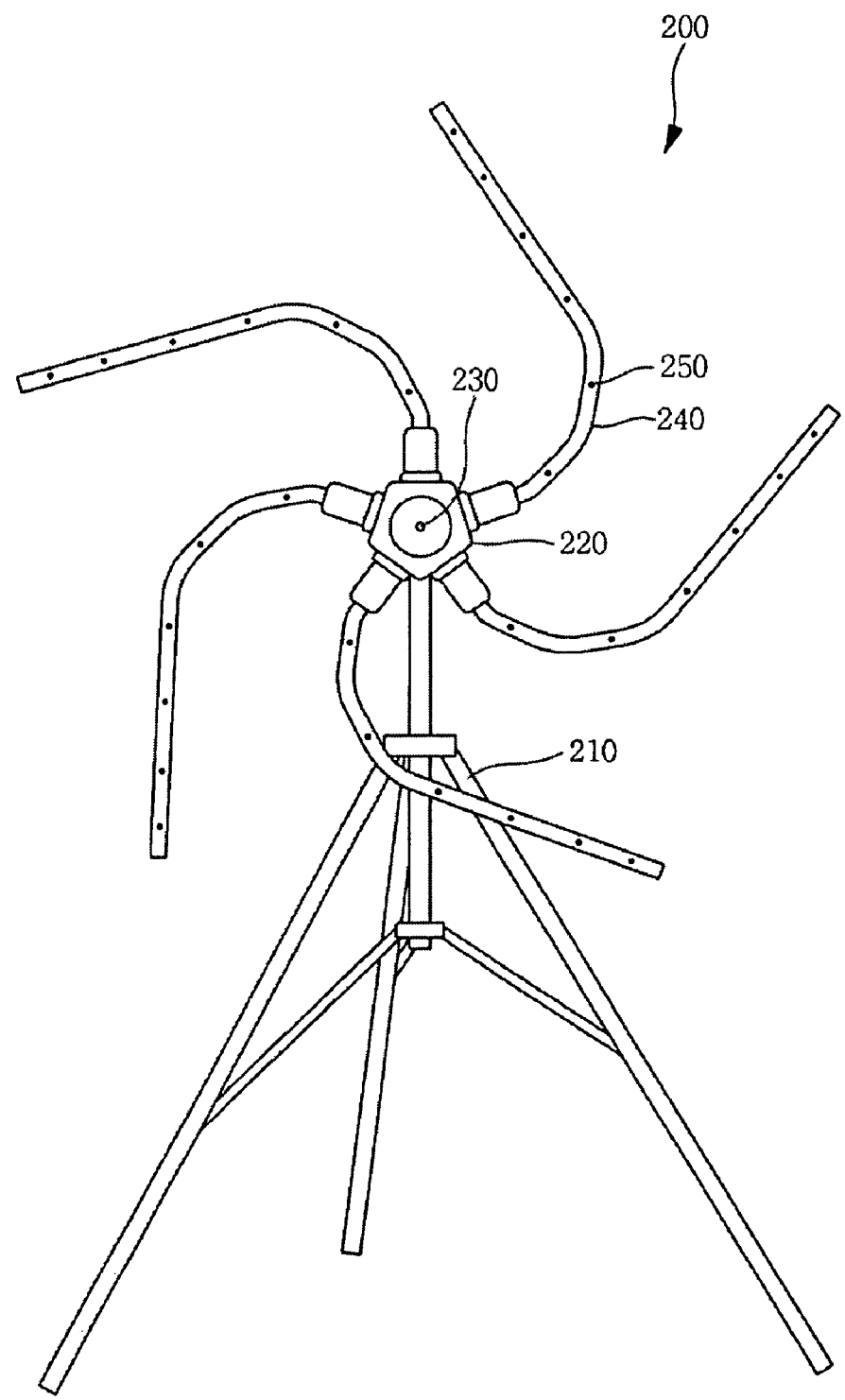
FIG. 2 is a view illustrating a sound camera according to an embodiment of the present invention.
Figure 3:
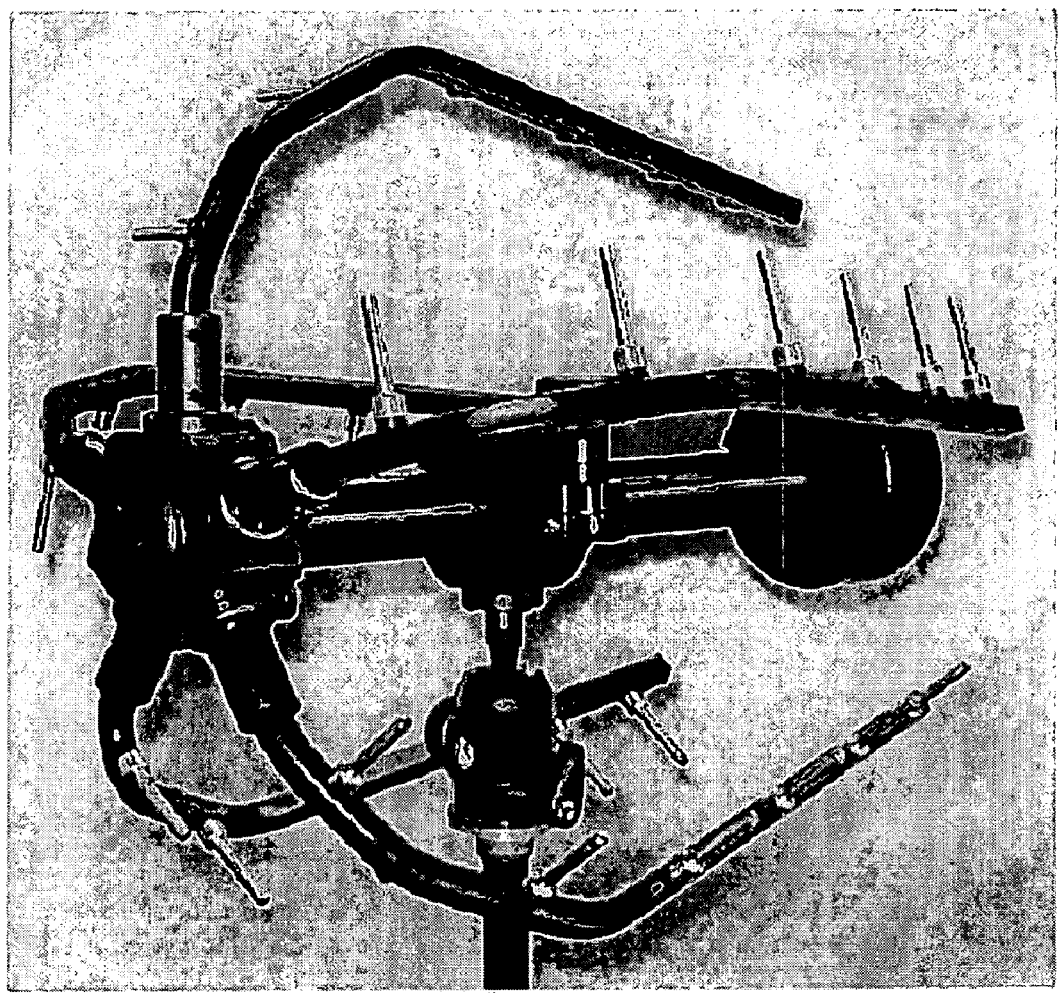
FIG. 3 is a view illustrating the sound camera, in which a microphone is folded, according to an embodiment of the present invention.

The sound detector 110 detects sound generated from a sound source. In detail, the sound detector 110 detects sound, generated from the sound source from which the sound detector 110 is distant by a predetermined distance, as an input. As the sound is detected, the sound signal is created from a surface detected by the sound detector, that is, a sound detecting surface. Moreover, the sound detector 110 includes a plurality of microphones for detecting sound. The sound detector 110 detects sound generated from the sound source well because of using the plurality of microphones. The number of the microphones may vary according to objects whose sound is detected, sound detecting circumstance, and the like. The sound detector 110 includes a supporting member, a body member installed on the supporting member, microphone supporting ribs install on the circumference of the body member at a predetermined interval to form a spiral shape when viewing the body in front of the body member, and a plurality of microphones arranged on the front sides of the microphone supporting ribs. Here, preferably the number of the microphones is 4 to 48, and the number of the microphone supporting ribs is 4 to 8. It is possible to arrange the microphones on a single plane or on at least two planes when viewing the sound detector 110 in front of the sound detector 110. The microphone supporting ribs can be folded forward or backward. The sound detector 110 will be described in detail with reference to FIGS. 2 and 3 illustrating a sound camera according to the embodiment of the present invention.

The background photographing unit 120 photographs a background where the sound source positions. In detail, the background photographing unit 120 takes a picture of the background of the sound source at a position away from the sound source. When the background is photographed, an image data is created. Moreover, the background photographing unit 120 includes a camera. The camera is installed at the front center of the body member of the sound detector 110 so that overlapped parts can be aligned with each other when the image data of the background where the sound source positions and the sound quality data of sound are displayed by the display 150. In other words, the background photographing unit 120 can take a picture of the background where the sound source positions. The background photographing unit 120 will be described in detail with reference to FIGS. 2 and 3.

The sound source signal generator 130 analyzes the sound signal detected by the sound detector 110 to create the sound source signal as the sound signal at the sound source plane where the sound source positions. The sound source signal is a sound signal at the sound source plane which is created by analyzing the sound signal detected at a sound detecting plane. The sound source signal indicates a sound signal at respective positions of the sound source plane. That is, the sound source signal contains sound pressure level information of pixels corresponding to position of the respective pixels of the image data photographed by the background photographing unit 120. For example, if the image data photographed by the background photographing unit 120 is data with a resolution of 1024*786 pixels, the sound source signal contains 1024*768 sound pressure level information, corresponding to the positions of the 1024*768 pixels.

The sound source signal generator 130 performs the analysis using a frequency domain analysis. That is, the sound source signal contains a sound source signal created by the frequency domain analysis. The sound source signal generator 130 uses a Fourier transform, a beamforming, or an inverse Fourier transform as a method for the frequency domain analysis. Here, the detected sound signal is created by the beamforming as a sound signal at the sound source plane, that is, a sound signal detected when the sound detector is installed directly to the sound source. In this embodiment of the present invention, it possible to use other method if the method is to analyze the sound signal in the frequency domain in addition to the Fourier transform, the beamforming, and the inverse Fourier transform.

Moreover, the sound signal generator 130 performs the analysis using a time domain analysis. In other words, the sound source signal contains a sound source signal created by the time domain analysis. The sound source signal generator 130 uses an inverse filtering of the time domain as one of methods for the time domain analysis. In this embodiment of the present invention, it is possible to other method if the method is for the time domain analysis in addition to the inverse filtering of the time domain. Moreover, in this embodiment of the present invention, it is possible to use the frequency domain analysis and the time domain analysis together as the signal processing.

The sound quality generator 140 processes the sound source signal to create sound quality data at the sound source plane. The sound quality data is created by the signal processing of a noise factor that is recognized by human. The sound quality data created from the sound source signal also contains sound quality data of pixels corresponding to the positions of the respective pixels of the image data. Therefore, the sound quality data contains spatial information for displaying the sound quality data on a two-dimensional screen of the display 150. Moreover, the sound quality data contains a quantitative factor such as loudness, sharpness, roughness, fluctuation strength, modulation depth, and tonality. The loudness is a recognizing quantity for the intensity of the sound, the sharpness is a recognizing quantity for a sharp sound, the roughness is a recognizing quantity for a rough sound, the fluctuation strength and the modulation depth are recognizing quantities for variation of the sound, and the tonality is a recognizing quantity for the composition of the sound. As such, these factors express the sound quality in quantitative manner and are noise references for determining the noise level, respectively.

The display 150 displays quality image data which is created by overlaying the image data of the background photographed by the background photographing unit 120 with the sound quality data. Here, the sound quality data contains sound quality spectrum data. In other words, the sound quality data contains the sound quality spectrum data in which the sound quality data is spectrumized, that is, which is displayed in different color based on the level of the sound quality of the sound quality data, and the display 150 displays the sound quality data together with the background data. The display 150 displays the sound detected by the sound detector 110 and the background photographed by the background photographing unit 120 in real time so that the sound quality image data can be displayed almost simultaneously with detecting the sound. The display 150 displays the spectrum on an image of the background such that the image of the background is projected. By doing so, human can recognize the position of the noise source from the background with naked eyes. The display 150 displays the sound quality image data as a still image or a moving picture. Therefore, the position information of the noise source can be precisely obtained by analyzing the still image and a trend of variation of the noise generated from the noise source can be understood by analyzing the moving picture. Although the sound quality data is spectrumized to display in this embodiment of the present invention, it is possible to use other method of visualizing the sound quality data to display. For example, the level of the sound quality of the sound quality data can be displayed by numerals.

As such, the sound quality display apparatus according to the embodiment of the present invention can create the sound quality data from the detected sound signal and can overlay the image data of the background where the sound source positions with the sound quality data. Therefore, the position of the noise source for generate noise can be precisely displayed. Moreover, the image data is overlaid with the sound quality data so that a user can easily recognize the information about the sound quality of the noise source.

FIG. 2 is a view illustrating the sound camera according to an embodiment of the present invention.

As illustrated in FIG. 2, the sound camera 200 according to this embodiment of the present invention includes a supporting member 210, a body member 220, a camera 230, microphone supporting ribs 240, and microphones 250.

The supporting member 210 supports the sound camera 200. In detail, the supporting member 210 supports the body member 220 installed on the supporting member 210, the camera 230, the microphone supporting ribs 240, and the microphones 250 with respect to the ground.

The body member 220 is installed on the supporting member 210. To the body member 220, the camera 230 and the microphone supporting ribs 240 are installed. The body member 220 allows an electric signal generator for converting the background photographed by the camera 230 and the sound detected by the microphones 250 into electric signals, that is, for creating the image data of the background and for creating a sound signal of the sound.

The camera 230 is installed to the front center of the body member 220. The camera 230 takes the background, facing the front side of the body member 220, where the sound source positions. The number of the camera is not limited to one but can be changed based on an object whose sound is detected and a circumstance for the detection of sound.

The microphone supporting ribs 240 are installed on the outer circumference of the body member 220 by a predetermined interval and form a spiral shape when viewing the body member 220 from front of the body member 220. The microphone supporting ribs 240 form the spiral shape so that microphones 250 are arranged in the spiral shape. The microphones 250 are arranged on a plane facing the background where the sound source positions in the spiral shape so that positions of and distance between the microphones 250 for detecting sound can be optimized. By doing so, the performance of detecting sound is increased and the detected sound signal is analyzed to precisely create the sound source signal at the sound source plane. In other words, the plurality of the microphone supporting ribs 240 form the spiral shape so that the optimized design of an array of the microphones 250 is enabled. Moreover, the microphone supporting ribs 240 are not integrally formed but are structured by a plurality of ribs so that manufacturing costs can be reduced and weight of the sound camera 200 can be decreased. Since each of the microphone supporting ribs 240 is bent forward or backward, the microphones 250 can be arranged on a single plane or at least two planes when viewing the supporting member 210 in front thereof. As such, the degree of freedom of the array of the microphones can be increased according to the object to be detected. Moreover, sound can be detected in stereoscopic manner so that the sound detecting performance can be enhanced. The microphone supporting ribs 240 are not bent but also folded forward or backward so that the portability of the sound camera 200 can be enhanced. The folding angle is approximately 90 degrees in the forward and backward direction, respectively. The number of the microphone supporting ribs 240 is no less than 4 so that the spiral shape can be maintained and the sufficient number of microphones 250 can be arranged. The number of the microphone supporting ribs 240 is less than 8 so that the manufacturing costs can be restricted.

The plural microphones 250 are arranged on the front sides of the microphone supporting ribs 240. The microphones 250 detect sound generated from the sound source facing the front side of the body member 220. The camera 230 is installed to the front center of the body member 220 and the microphones 250 are arranged on the front sides of the microphone supporting ribs 240 so that the spatial position of the background to be photographed can be aligned with the spatial position of the sound to be detected. Moreover, the number of the microphones 250 is no less than 4 so that the detecting performance can be increased. When the number of the microphones 250 is less than 48, the increase of the manufacturing costs and delay of processing time during the driving can be restricted.

Therefore, the sound camera 200 according to this embodiment of the present invention can detect sound well and can take a picture of the background well. Moreover, the manufacturing costs and time can be reduced.

FIG. 3 is a view illustrating the sound camera, in which a microphone is folded, according to the embodiment of the present invention.

As illustrated in FIG. 3, the microphone supporting ribs 240 are not bent but also folded forward or backward so that the portability of the sound camera 200 can be enhanced. The folding angle is approximately 90 degrees in the forward and backward direction, respectively. The sound camera 200 can detect sound and take a picture of the background even when being folded.

Figure 4:
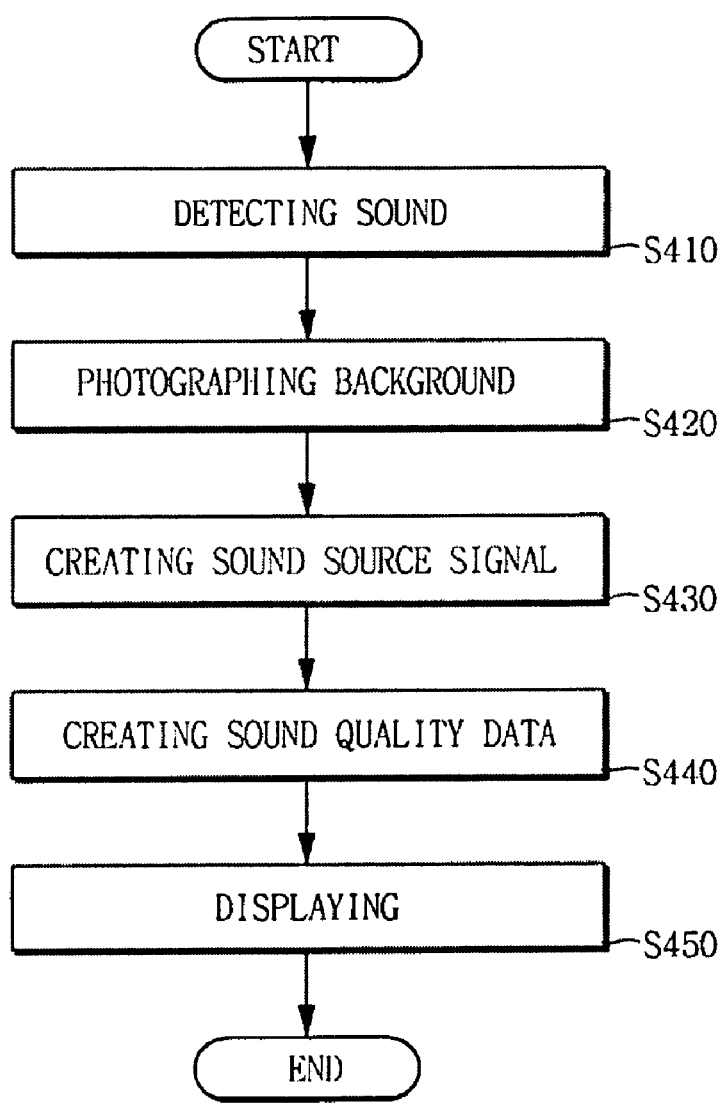
FIG. 4 is a flowchart illustrating a sound quality display method according to an embodiment of the present invention.

FIG. 4 is a flowchart illustrating a sound quality display method according to an embodiment of the present invention.

As illustrated in FIG. 4, in this embodiment of the present invention, firstly the sound generated from the sound source is detected (S410). Simultaneously, the background where the sound source is positioned is photographed (S420).

Next, the sound signal detected in the sound detecting operation (S410) is analyzed to create the sound source signal as the sound signal at the sound source plane where the sound source is positioned (S430). The sound source signal is a sound signal at the sound source plane which is created by analyzing the sound signal detected at a sound detecting plane where the sound detector is positioned. Moreover, the sound source signal indicates sound signals at respective positions of the sound source plane. That is, the sound source signal contains sound pressure level information of pixels corresponding to position of the respective pixels of the image data photographed in the background photographing operation. The operation of creating the sound source signal (S430) will be described in detail with reference to FIGS. 5 and 6 later.

Next, the sound source data at the sound source plane is created by the signal processing of the sound source signal (S440). The sound quality data is data created based on a noise factor that is recognized by human. The sound quality data created from the sound source signal also contains sound quality data of pixels corresponding to the positions of the respective pixels of the image data. The sound quality data creating operation (S440) will be described in detail with reference to FIGS. 7 and 9 later.

Next, quality image data, which is created by overlaying the image data of the background photographed in the background photographing operation (S410) with the sound quality data, is displayed (S450). In the operation of displaying the sound quality image data (S450), the sound detected in the sound detecting operation (S410) and the background photographed in the background photographing operation (S420) are displayed in real time so that the sound quality image data can be displayed almost simultaneously with detecting the sound. Moreover, in the displaying operation (S450), the spectrum is displayed on an image of the background such that the image of the background is projected. By doing so, human can recognize the position of the noise source from the background with naked eyes. In the displaying operation (S450), the sound quality image data is displayed as a still image or a moving picture. Therefore, the position information of the noise source can be precisely obtained by analyzing the still image and a trend of variation of the noise generated from the noise source can be understood by analyzing the moving picture. In this embodiment of the present invention, the sound quality data contains the sound quality spectrum data in which the sound quality data is spectrumized, that is, which is displayed in different color based on the level of the sound quality of the sound quality data. Here, the sound quality data may contain the sound quality spectrum data as well as sound quality numeral data of displaying the level of the sound quality of the sound quality data.

As such, in the sound quality display method according to the embodiment of the present invention, the sound quality data can be created from the detected sound signal and the image data of the background where the sound source positions can be displayed together with the sound quality data by being overlaid with each other. Therefore, the position of the noise source for creating noise can be precisely displayed in the sound quality display method according to this embodiment of the present invention. Moreover, the image data is overlaid with the sound quality data so that the user can easily recognize the information about the sound quality of the noise source.

Figure 5:
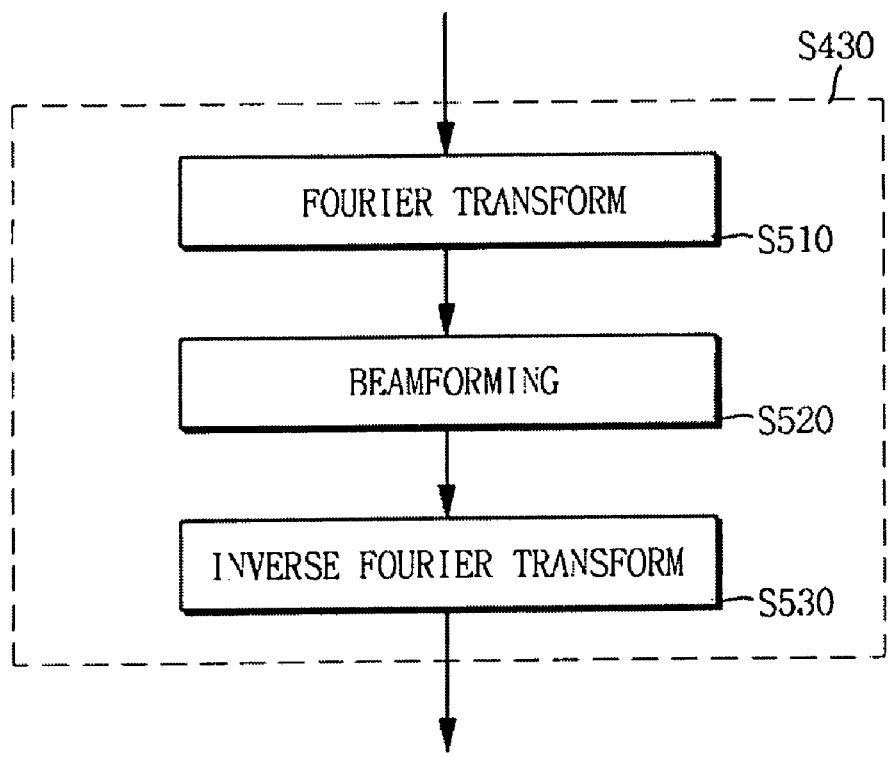
FIG. 5 is a flowchart illustrating an operation of creating a sound source signal in the sound quality display method according to the embodiment of the present invention.

FIG. 5 is a flowchart illustrating the operation of creating a sound source signal in the sound quality display method according to the embodiment of the present invention.

As illustrated in FIG. 5, in the sound source signal creating operation (S430) of the sound quality display method according to this embodiment of the present invention, the frequency domain analysis including a Fourier transforming operation (S510), a beamforming operation (S520), and an inverse Fourier transforming operation (S530) is used to create the sound source signal. The sound source signal contains a sound source signal created due to the frequency domain analysis. Here, the detected sound signal is created as a sound signal at the sound source plane by the beamforming, that is, a sound signal detected when the sound detector is installed directly to the sound source. In this embodiment of the present invention, it possible to use other method if the method is to analyze the sound signal in the frequency domain in addition to the Fourier transform, the beamforming, and the inverse Fourier transform.

Figure 6:
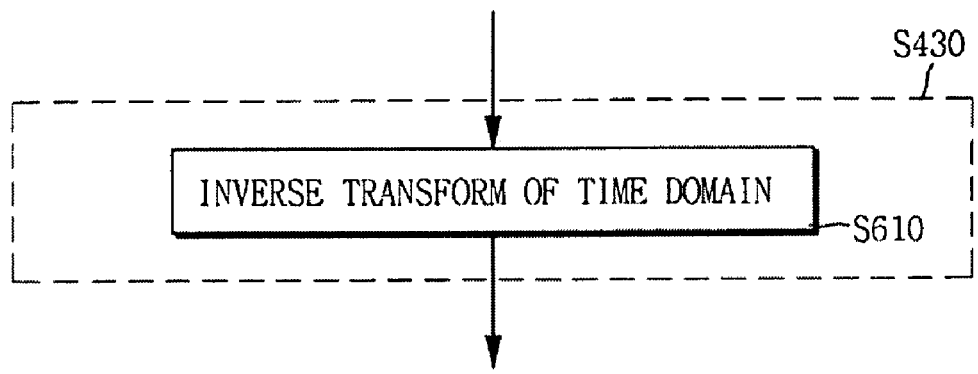
FIG. 6 is a view illustrating an operation of creating a sound source signal in a sound quality display method according to another embodiment of the present invention.

FIG. 6 is a view illustrating an operation of creating a sound source signal in a sound quality display method according to another embodiment of the present invention.

As illustrated in FIG. 6, in the sound source signal creating operation (S430) of the sound quality display method according to another embodiment of the present invention, the sound source signal is created using a time domain analysis including an inverse filtering of a time domain (S610). In other words, the sound source signal contains a sound source signal created by the time domain analysis. In this embodiment of the present invention, it is possible to other method if the method is for the time domain analysis in addition to the inverse filtering of the time domain. Moreover, in this embodiment of the present invention, it is possible to use the frequency domain analysis and the time domain analysis together as the signal processing.

As such, the sound source signal is created as a time signal at the sound source plane through the sound source signal creating operation (S430). Next, in the sound quality data creating operation (S440), the sound quality data is created by the signal processing of the sound source signal. The sound quality data is data expressed by recognizing quantity with respect to a noise factor, which human recognizes as noise, from a physical quantity of the detected sound in quantitative manner. The method of creating the sound quality data based on the noise factor will be described with reference to FIGS. 7 to 9.

Figure 7:
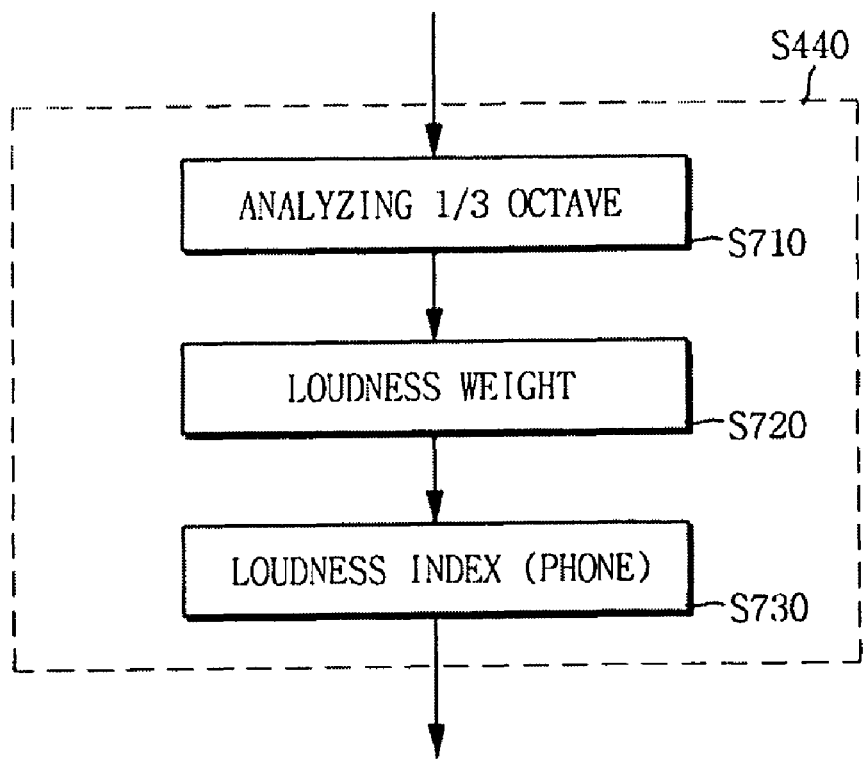
FIG. 7 is a flowchart illustrating an operation of creating sound quality data in the sound quality display method according to the embodiment of the present invention.

FIG. 7 is a flowchart illustrating the operation of creating sound quality data in the sound quality display method according to the embodiment of the present invention.

FIG. 7 illustrates a signal processing operation of creating the sound source signal as the sound quality data by considering the loudness as the quantitative noise factor.

Firstly, the sound source signal is analyzed using a ⅓ octave broadband (S710).

Next, a loudness weight is applied to the sound source signal to be corresponded to the ⅓ octave broadband (S720).

Then, a loudness index based on a level of frequency band of the sound source signal is determined from a predetermined loudness index and overall loudness is estimated (S730).

By doing so, the sound quality data can express the recognizing quantity with respect to the magnitude of sound in quantitative manner by a phone as a unit of the loudness.

Figure 8:
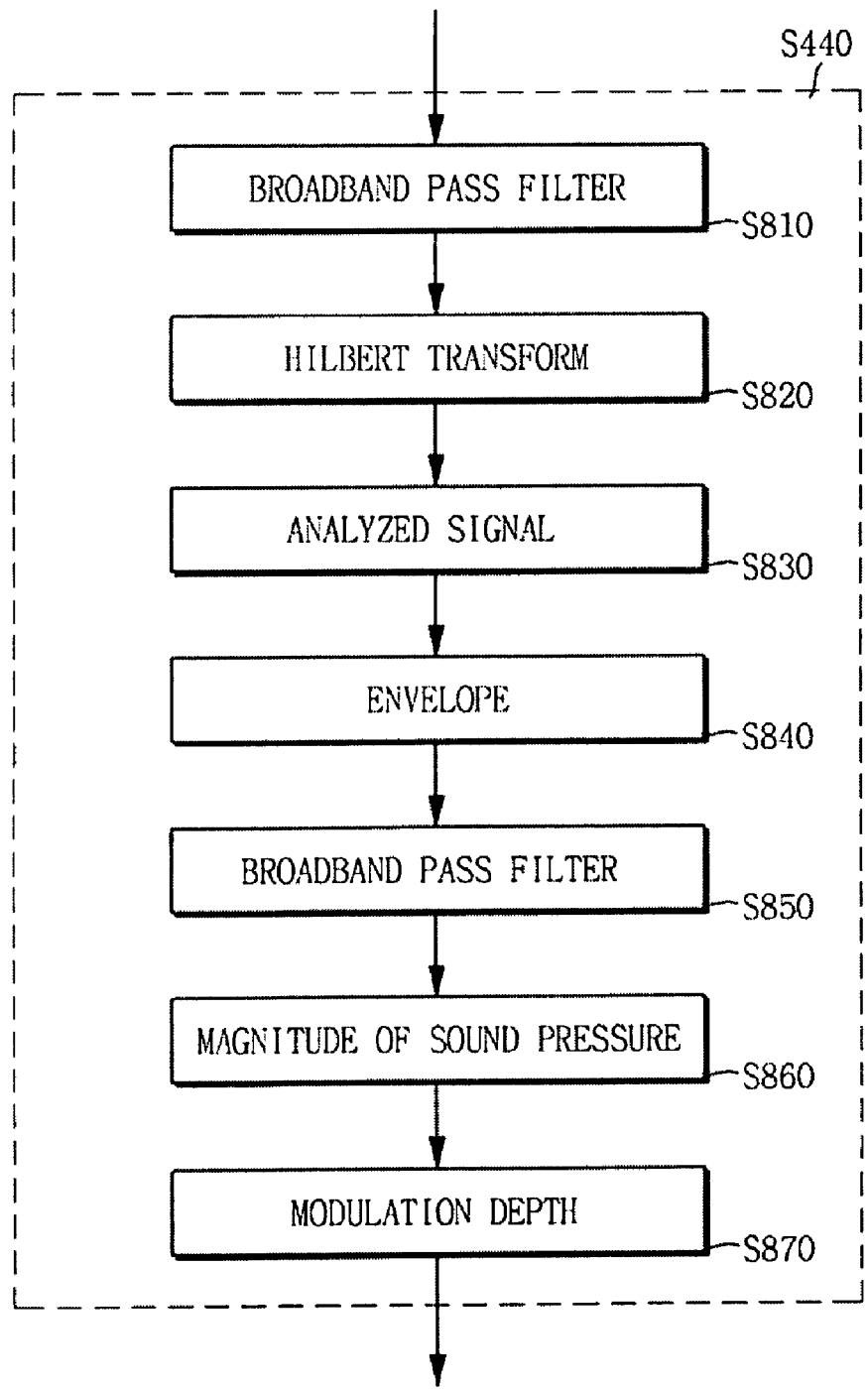
FIGS. 8 and 9 are views illustrating an operation of creating sound quality data in a sound quality display method according to another embodiment of the present invention.
Figure 9:
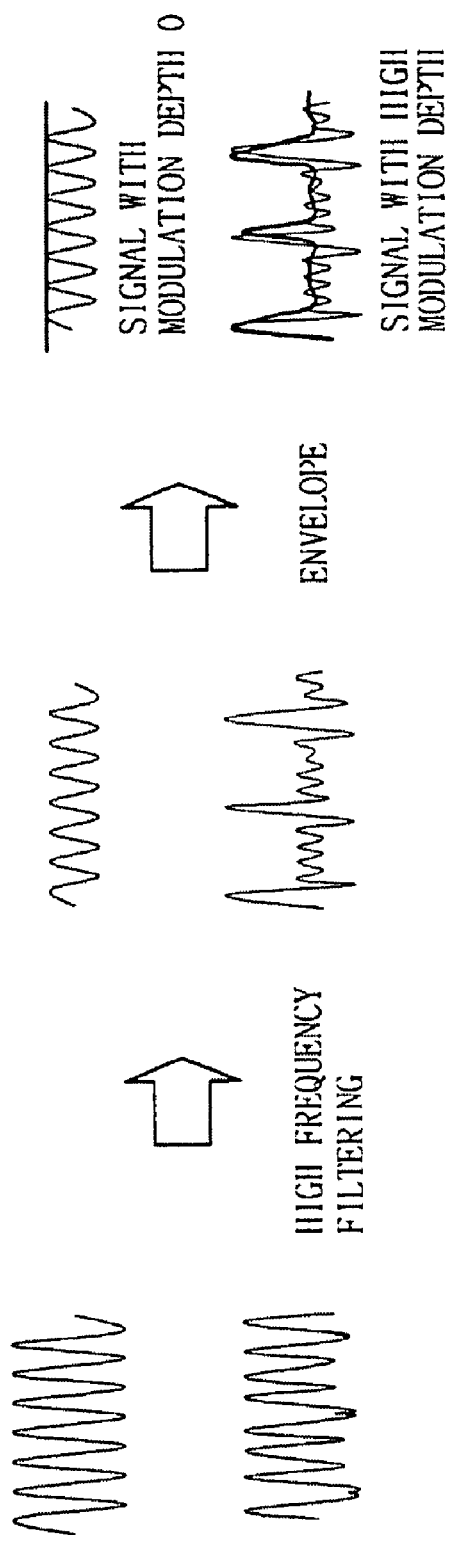

FIGS. 8 and 9 are views illustrating an operation of creating sound quality data in a sound quality display method according to another embodiment of the present invention. FIG. 8 illustrates a signal processing operation of creating the sound source signal as the sound quality data by considering the modulation depth as the quantitative noise factor, and FIG. 9 illustrates the sound source signal processed by the method in FIG. 8.

The sound source signal, as illustrated in FIGS. 8 and 9, is created as the sound quality data through a broadband pass filtering (S810), a Hilbert transforming operation (S820), an analytic signal processing operation (S830), an enveloping operation (S840), a broadband pass filtering operation (S850), a sound pressure magnitude operation (S860), and a modulation depth creating operation (S870).

Here, in view of amplitude modulation, the modulation depth is referred to a ratio of amplitude of modulated carried with respect to deviation of amplitude in which a modulated carrier reaches a minimum value. If the minimum value is 0 (zero), the modulation depth is 100%.

By doing so, the sound quality data can the recognizing quantity with respect to the change of sound by the modulation depth in the quantitative manner.

Figure 10:
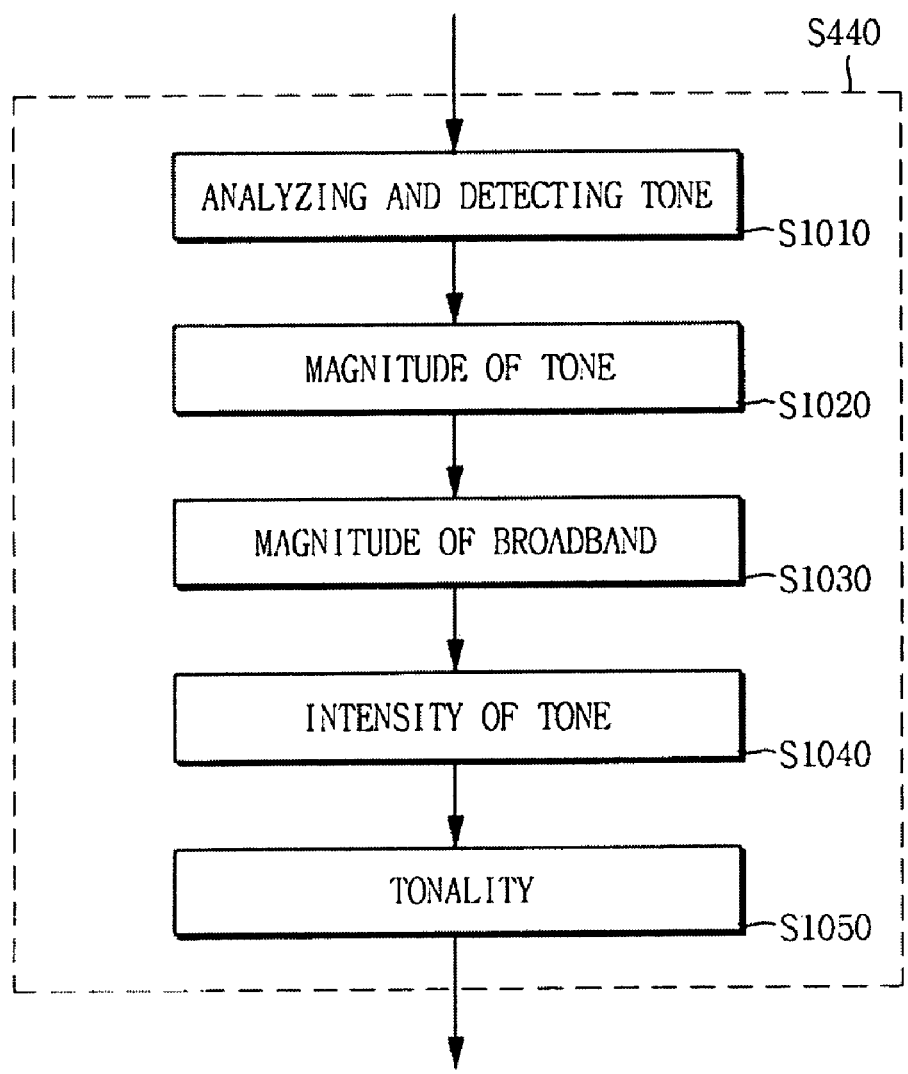
FIG. 10 is a view illustrating an operation of creating sound quality data in a sound quality display method according to still another embodiment of the present invention.

FIG. 10 is a view illustrating an operation of creating sound quality data in a sound quality display method according to still another embodiment of the present invention. FIG. 10 illustrates a signal processing operation of creating the sound source signal as the sound quality data by considering the tonality as the quantitative noise factor.

The sound source signal, as illustrated in FIG. 10, is created as the sound quality data through a tone component detecting operation (S1010), a tone magnitude estimating operation (S1020), a broadband magnitude estimating operation (S1030), a tone intensity estimating operation (S1040), and a tonality creating operation (S1050).

By doing so, the sound quality data can express the recognizing quantity for the composition of sound in quantity due to the tonality.

Figure 11:
FIG. 11 is view illustrating a sound quality image that is displayed by the sound quality display apparatus and the sound quality display method according to the embodiment of the present invention.

FIG. 11 is view illustrating the sound quality image that is displayed by the sound quality display apparatus and the sound quality display method according to the embodiment of the present invention.

FIG. 11 illustrates a circumstance when music is played out of a speaker and a steel ball contained in a can clatters by shaking the can. In this case, the sound quality image that is displayed by the sound quality display apparatus and the sound quality display method according to the embodiments of the present invention is displayed such that none of sound quality spectrum is displayed at a position where the speaker is positioned, the sound quality spectrum is displayed at a position where the can is positioned in red around the can, in yellow, green, and blue as goes forward environs thereof. Here, colors of the spectrum are set to be displayed by red-side colors in the spectrum of visible light as the level of the sound quality of the sound quality data, that is, the noise level is high, and by violet-side colors in the spectrum of visible light as the noise level is low. Moreover, when the noise level is 0 (zero), the sound quality data is set to be displayed without color. A factor of the sound quality data is the modulation depth.

As such, according to this embodiment of the present invention, since only sound generated from the can is precisely display, the user can easily find the position of the noise source and can easily measure the precise level of noise generated from the noise source.

Figure 12:
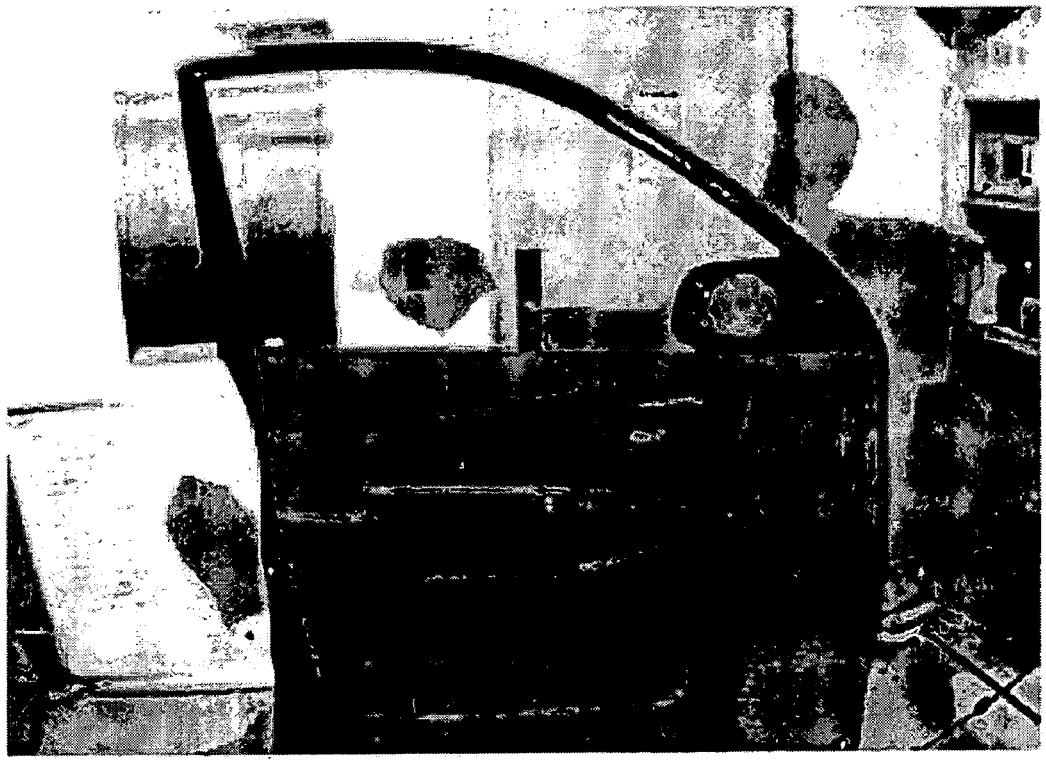
FIG. 12 is view illustrating another sound quality image that is displayed by the sound quality display apparatus and the sound quality display method according to the embodiment of the present invention.

FIG. 12 is view illustrating another sound quality image that is displayed by the sound quality display apparatus and the sound quality display method according to the embodiment of the present invention.

FIG. 12 illustrates a circumstance when loud music is played out of a woofer installed in the front right lower side of a vehicle door and a loosen bolt inserted into the right side of the vehicle door clatters due to the vibration of the woofer. In this case, the sound quality image that is displayed by the sound quality display apparatus and the sound quality display method according to the embodiments of the present invention is displayed such that the sound quality spectrum is displayed in green and red at the position where the speaker is positioned, in red around the bolt, and in yellow, thin green, and blue as goes forward environs thereof. In this case, the factor of the sound quality data is the modulation depth, thus it can be understood that the display of the sound quality spectrum at the position where the speaker is positioned is not because the music played out of the speaker but the vibration of the speaker.

As such, in this embodiment of the present invention, since only the vibration generated from the vehicle door, particularly, the sound generated from the bolt is precisely displayed, the user can easily find the position of the noise source and can easily measure the precise level of noise generated from the noise source.

Figure 13:
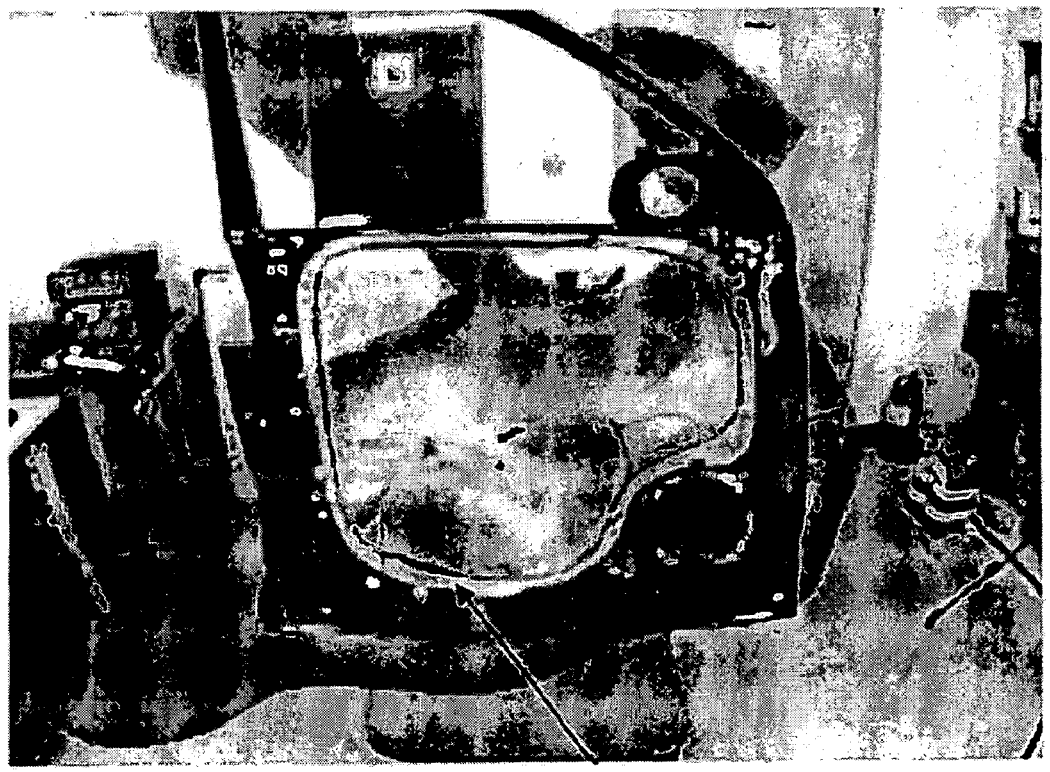
FIG. 13 is view illustrating still another sound quality image that is displayed by the sound quality display apparatus and the sound quality display method according to the embodiment of the present invention.

FIG. 13 is view illustrating still another sound quality image that is displayed by the sound quality display apparatus and the sound quality display method according to the embodiment of the present invention.

FIG. 13 illustrates a circumstance when loud music is played out of a woofer installed in the front right lower side of a vehicle door and a white plastic installed to the front left lower side of the vehicle door by a small distance from the vehicle door trembles due to the vibration of the speaker. In this case, the sound quality image that is displayed by the sound quality display apparatus and the sound quality display method according to the embodiments of the present invention is displayed such that the sound quality spectrum is displayed in green and blue at the position where the speaker is positioned, in red at the position where the plastic is positioned around the plastic, and in yellow, thin green, and blue as goes forward environs thereof. The factor of the sound quality data at that time is the modulation depth, thus, even in the case of FIG. 13, it can be understood that the display of the sound quality spectrum at the position where the speaker is positioned is not because the music played out of the speaker but the vibration of the speaker.

As such, in this embodiment of the present invention, since only the vibration generated from the vehicle door, particularly, the sound generated from the plastic member is precisely displayed, the user can easily and precisely find the position of the noise source and can easily measure the precise level of noise generated from the noise source.

Figure 14:
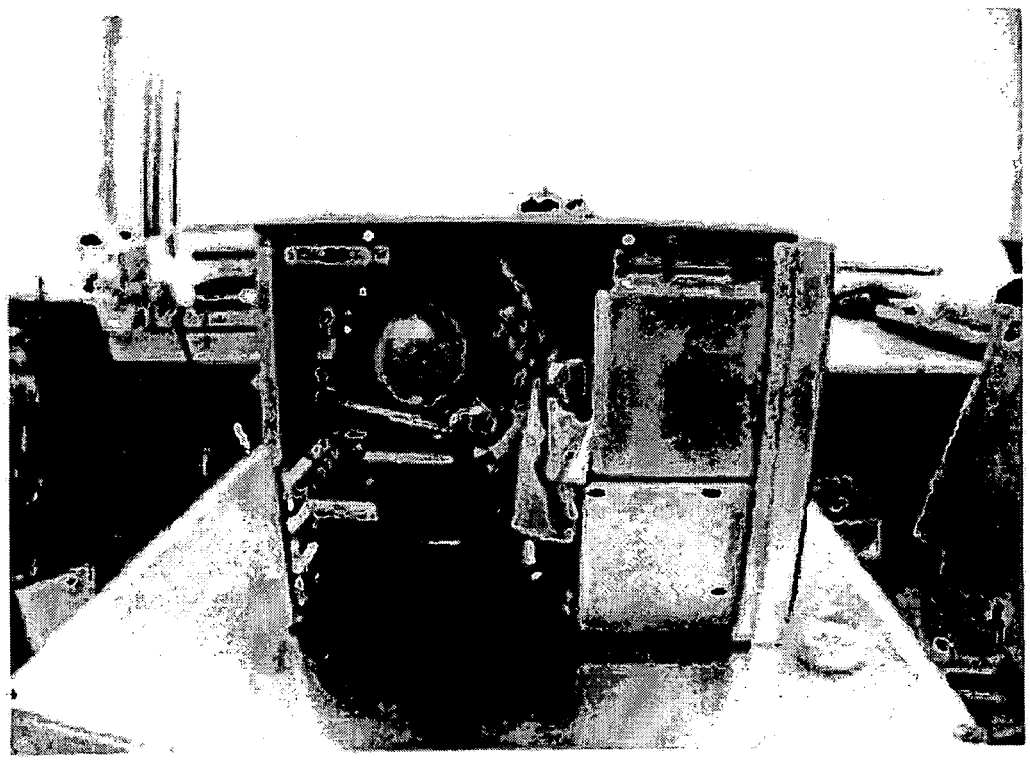
FIG. 14 is view illustrating still another sound quality image that is displayed by the sound quality display apparatus and the sound quality display method according to the embodiment of the present invention.

FIG. 14 is view illustrating still another sound quality image that is displayed by the sound quality display apparatus and the sound quality display method according to the embodiment of the present invention. In more detail, FIG. 14 illustrates the sound quality image in which the sound quality image is displayed by considering the modulation depth as the quantitative factor when sound generated from a computer is detected. The sound quality spectrum in FIG. 14 precisely indicates a fan for generating the loudest noise in a computer as a noise source.

As described above, according to the present invention, the sound quality data is created based on the noise factor recognized as noise by human and the image data of the background where the sound source is positioned is overlaid with the sound quality data so that the position of the noise source where the noise is generated can be precisely displayed.

Moreover, since the sound quality data is created based on various noise factors, noise can be measured based on various factors.

As such, it can be understood by those skilled in the art that the above-mentioned structure of the present invention may be made in other variations without changing the principle and technical features of the present invention.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sound quality display apparatus comprising:
   a sound detector for detecting sound generated from a sound source;
   a background photographing unit for photographing a background where the sound source is positioned;
   a sound source signal generator for creating a sound source signal as a sound signal at a sound source plane where the sound source is positioned by analyzing the sound signal detected by the sound detector;
   a sound quality data generator for creating sound quality data at the sound source plane by processing of the sound source signal; and
   a display for displaying sound quality image data created by overlaying image data of the background photographed by the background photographing unit with the sound quality data
   wherein the sound quality data includes at least one of loudness, sharpness, roughness, fluctuation strength, modulation depth, and tonality, as a quantitative factor.

2. The sound quality display apparatus according to claim 1, wherein the sound source signal comprises a sound source signal created by performing a frequency domain analysis.

3. The sound quality display apparatus according to claim 2, wherein the frequency domain analysis comprises Fourier transform, beamforming, or inverse Fourier transform.

4. The sound quality display apparatus according to claim 1, wherein the sound source signal comprises a sound source signal created by performing a time domain analysis.

5. The sound quality display apparatus according to claim 4, wherein the time domain analysis comprises an inverse filtering of a time domain.

6. The sound quality display apparatus according to claim 1, wherein the sound detector comprises a plurality of microphones and the background photographing unit comprises a camera for taking a picture of the background.

7. A sound quality display apparatus comprising:
   a sound detector for detecting sound generated from a sound source;
   a background photographing unit for photographing a background where the sound source is positioned;
   a sound source signal generator for creating a sound source signal as a sound signal at a sound source plane where the sound source is positioned by analyzing the sound signal detected by the sound detector;
   a sound quality data generator for creating sound quality data at the sound source plane by processing of the sound source signal; and
   a display for displaying sound quality image data created by overlaying image data of the background photographed by the background photographing unit with the sound quality data
   wherein the sound detector comprises:
   a supporting member;
   a body member installed on the supporting member;
   microphone supporting ribs installed on the outer circumference of the body member at a predetermined interval and forming a spiral shape when viewing the body member in front thereof and
   a plurality of microphones arranged on the front sides of the microphone supporting ribs; and
   the background photographing unit is installed to the front center of the body member.

8. The sound quality display apparatus according to claim 7, wherein the number of the microphones is 4 to 48.

9. The sound quality display apparatus according to claim 7, wherein the microphones are arranged on a single plane or at least two planes when viewing the sound detector in front thereof.

10. The sound quality display apparatus according to claim 7, wherein the number of the microphone supporting ribs is 4 to 8.

11. The sound quality display apparatus according to claim 7, wherein the microphone supporting ribs are folded forward or backward.

12. The sound quality display apparatus according to claim 1, wherein the sound quality data comprises sound quality spectrum data.

13. The sound quality display apparatus according to claim 1 or 12, wherein the display displays the sound quality image data in real time.

14. The sound quality display apparatus according to claim 12, wherein the display displays the sound quality spectrum data on an image of the background such that the image of the background is projected.

15. The sound quality display apparatus according to claim 1 or 12, wherein the display displays the sound quality image data as one of a still image and a moving picture.

16. A non-transitory computer readable medium on which a sound quality display program is recorded, which, when executed by a computer, causes the computer to perform a method comprising the steps of:
  detecting sound generated from a sound source;
  photographing a background where the sound source is positioned;
  creating a sound source signal as a sound signal at a sound source plane where the sound source is positioned by analyzing the sound signal detected in the sound detecting step;
  creating sound quality data at the sound source plane by processing the sound source signal; and
  displaying sound quality image data created by overlaying the image data of the background photographed in the background photographing step with the sound quality data
  wherein the sound quality data includes at least one of loudness, sharpness, roughness, fluctuation strength, modulation depth, and tonality, as a quantitative factor.

17. A sound camera comprising:
  a supporting member;
  a body member installed on the supporting member;
  a camera installed to the front center of the body member;
  microphone supporting ribs installed on the outer circumference of the body member at a predetermined interval and forming a spiral shape when viewing the body member in front thereof; and
  a plurality of microphones arranged on the front sides of the microphone supporting ribs.

18. The sound camera according to claim 17, wherein the number of the microphones is 4 to 48.

19. The sound camera according to claim 17 or 18, wherein the microphones are arranged on a single plane or at least two planes when viewing the sound detector in front thereof.

20. The sound camera according to claim 17 or 18, wherein the number of the microphone supporting ribs is 4 to 8.

21. The sound camera according to claim 17 or 18, wherein the microphone supporting ribs are folded forward or backward.

* * * * *